(12) United States Patent
Arai (10) Patent No.: US 8,943,446 B2
(45) Date of Patent: Jan. 27, 2015

(54) GENERATION METHOD, STORAGE MEDIUM AND INFORMATION PROCESSING APPARATUS

(71) Applicant: Canon Kabushiki Kaisha, Tokyo (JP)

(72) Inventor: Tadashi Arai, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 14/174,083

(22) Filed: Feb. 6, 2014

(65) Prior Publication Data

US 2014/0245241 A1 Aug. 28, 2014

(30) Foreign Application Priority Data

Feb. 22, 2013 (JP) ................. 2013-033870

(51) Int. Cl.
*G06F 17/50* (2006.01)
(52) U.S. Cl.
CPC .................. *G06F 17/5068* (2013.01)
USPC ........................................................... 716/55
(58) Field of Classification Search
CPC .................................................. G03F 7/70466
USPC ........................................................... 716/55
See application file for complete search history.

(56) References Cited

U.S. PATENT DOCUMENTS

| | | | |
|---|---|---|---|
| 2004/0224236 A1* | 11/2004 | Sturtevant et al. | 430/5 |
| 2007/0028200 A1* | 2/2007 | Blatchford et al. | 716/10 |
| 2007/0031738 A1 | 2/2007 | Huckabay | |
| 2008/0260257 A1* | 10/2008 | Rose | 382/195 |
| 2009/0125866 A1* | 5/2009 | Wang et al. | 716/19 |
| 2011/0078638 A1 | 3/2011 | Kahng et al. | |

OTHER PUBLICATIONS

Ban et al. Flexible 2D layout decomposition framework for spacer-type double pattering lithography. 48th Design Automation Conference, Jun. 2011.*

Smayling, Michael C., et al.; "Low k1 Logic Design using Gridded Design Rules"; Design for Manufacturability through Design-Process Integration II, Proc. of SPIE vol. 6925 69250B-1; 2008; pp. 1-7.

* cited by examiner

*Primary Examiner* — Vuthe Siek
*Assistant Examiner* — Aric Lin
(74) *Attorney, Agent, or Firm* — Rossi, Kimms & McDowell LLP (57) ABSTRACT

The present invention provides a generation method of generating data of patterns of a plurality of masks used in an exposure apparatus for exposing a substrate, including a step of specifying, from a plurality of points on a grid having pattern elements to be formed on the substrate as intersections, an allowable point that allows a pattern to be transferred other than points of target pattern elements constituting a target pattern to be formed on the substrate, and a step of, for a pattern element group including a target pattern element whose distance to an adjacent target pattern element is shorter than a resolution limit of the exposure apparatus, grouping the adjacent target pattern elements on the grid a space between which is filled with the allowable point.

8 Claims, 7 Drawing Sheets

GENERATION METHOD, STORAGE MEDIUM AND INFORMATION PROCESSING APPARATUS

BACKGROUND OF THE INVENTION

1. Field of the Invention

The present invention relates to a generation method of generating the data of the patterns of a plurality of masks used in at least one of a plurality of exposure apparatuses, a storage medium, and an information processing apparatus.

2. Description of the Related Art

An exposure apparatus is used in a lithography process that is a semiconductor device manufacturing process. In the lithography process, the circuit pattern of a semiconductor device is transferred to a substrate (for example, silicon substrate, glass substrate, or wafer). The exposure apparatus includes an illumination optical system that illuminates a mask (reticle) with light from a light source, and a projection optical system that projects the pattern (circuit pattern) formed on the mask to the substrate.

To cope with the recent finer design rules of semiconductor devices, the exposure apparatus performs multiple patterning (multiple exposure) in which a substrate is exposed a plurality of times using a plurality of masks, and the patterns of the plurality of masks are overlaid and formed in one layer on the substrate. The resolution limit at which the exposure apparatus cannot obtain a sufficient exposure margin is generally represented by $hp = k_1 \times \lambda / NA$ where hp is the half of the shortest distance between adjacent patterns, that is, the half pitch, $k_1$ is the process factor, $\lambda$ is the wavelength of exposure light (exposure wavelength), and NA is the numerical aperture of the projection optical system. The multiple patterning is a technique of dividing a pattern having a half pitch smaller than that corresponding to the resolution limit of the exposure apparatus into a plurality of patterns (that is, a plurality of masks) and exposing the masks, thereby resolving the pattern smaller than the resolution limit in one exposure.

As a technique associated with multiple patterning, for example, U.S. 2011/0078638 proposes a method of dividing a mask pattern (pattern (target pattern) to be transferred to a substrate) into a plurality of patterns. U.S. 2011/0078638 discloses a method of dividing a pattern using a conflict graph and mathematical programming. The conflict graph is formed form nodes and edges. When dividing a pattern, each pattern element that constitutes the pattern is represented by a node, and pattern elements having a distance exceeding the resolution limit are connected by an edge. In U.S. 2011/0078638, a pattern is divided using mathematical programming such that an edge has different mask numbers at its two ends. U.S. 2011/0078638 also discloses a method of reducing (solving) division contradictions (the number of nodes or edges of a conflict graph) from the design point of view by dividing one pattern element into a plurality of pattern elements.

U.S. 2007/0031738 proposes another method of reducing division contradictions from the design point of view. U.S. 2007/0031738 discloses a method of reducing division contradictions from the design point of view by grouping a plurality of pattern elements spaced apart by a predetermined distance or more.

On the other hand, for low $k_1$ lithography, it becomes difficult to faithfully transfer a predetermined pattern of a two-dimensional layout (a pattern spreading in the vertical and horizontal directions) to a substrate. Recently, a circuit pattern forming method called a one-dimensional layout technology is proposed in "Michael C. Smayling et. al., "Low k1 Logic Design using Gridded Design Rules" Proc. of SPIE Vol. 6925 (2008)". In this technology, a single-pitch L/S (line and space) pattern is formed. Then, pattern elements such as hole patterns and cut patterns are formed on an iso-grid at a plurality of positions in the same image dimensions. The single-pitch L/S pattern is cut by the pattern elements, thus forming a circuit pattern. The one-dimensional layout technology can not only reduce the exposure area as compared to the two-dimensional layout technology but also technically facilitate the exposure itself.

In the techniques disclosed in U.S. 2011/0078638 and U.S. 2007/0031738, however, a pattern is divided or division contradictions from the design point of view are reduced assuming a pattern of a two-dimensional layout. Hence, the method of reducing the division contradictions from the design point of view by dividing a pattern element into a plurality of pattern elements cannot be applied to the one-dimensional layout where one pattern element is not divided.

U.S. 2007/0031738 proposes discloses a method of grouping noncritical pattern elements spaced apart by a predetermined distance (critical pitch) or more. However, a method of grouping critical pattern elements is not disclosed in U.S. 2007/0031738, and many division contradictions from the design point of view remain unsolved.

SUMMARY OF THE INVENTION

The present invention provides a technique advantageous in generating the data of the patterns of a plurality of masks used in multiple patterning.

According to one aspect of the present invention, there is provided a generation method of generating data of patterns of a plurality of masks used in an exposure apparatus for exposing a substrate, including the following steps being performed by a computer a first step of specifying, from a plurality of points on a grid having pattern elements to be formed on the substrate as intersections, an allowable point that allows a pattern to be transferred other than points of target pattern elements constituting a target pattern to be formed on the substrate, a second step of, for a pattern element group including a target pattern element whose distance to an adjacent target pattern element is shorter than a resolution limit of the exposure apparatus, grouping the adjacent target pattern elements on the grid a space between which is filled with the allowable point, and a third step of generating the data of the patterns of the plurality of masks such that mask pattern elements corresponding to the target pattern elements grouped in the second step are arranged in the same mask.

Further aspects of the present invention will become apparent from the following description of exemplary embodiments with reference to the attached drawings.

DESCRIPTION OF THE EMBODIMENTS

Preferred embodiments of the present invention will be described below with reference to the accompanying drawings. Note that the same reference numerals denote the same members throughout the drawings, and a repetitive description thereof will not be given.

<First Embodiment>

Figure 1:
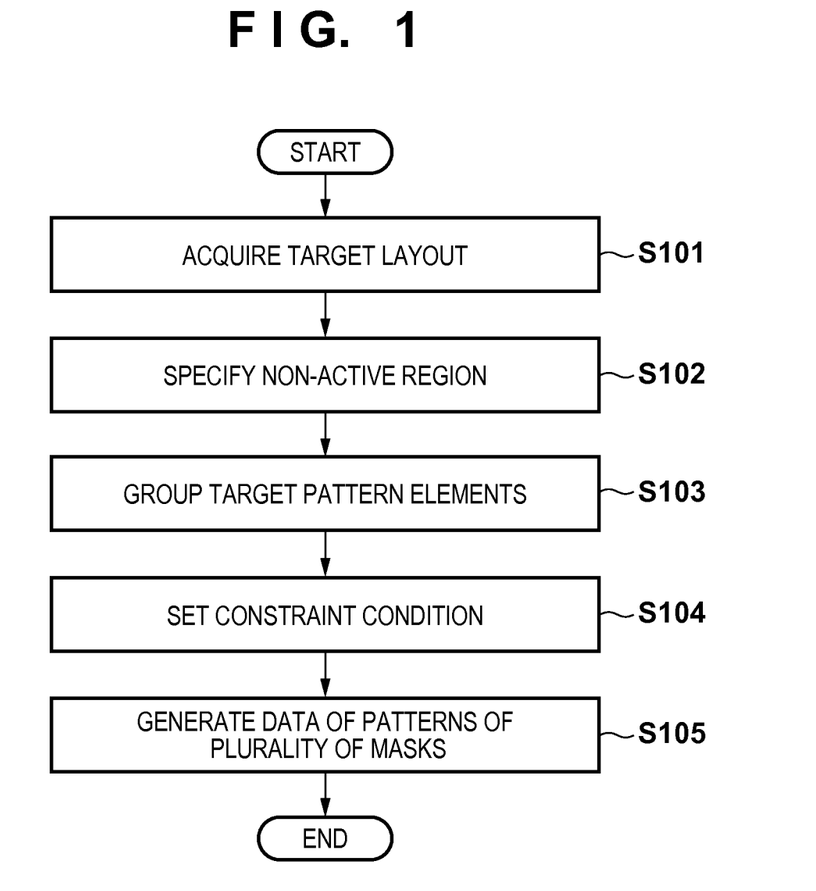
FIG. 1 is a flowchart for explaining a generation method according to the first embodiment of the present invention.

FIG. 1 is a flowchart for explaining a generation method according to the first embodiment of the present invention. This generation method is executed by (the processing unit of) an information processing apparatus such as a computer to generate the data of the patterns of a plurality of masks used in multiple patterning to be performed by an exposure apparatus for exposing a substrate. In multiple patterning, the patterns of a plurality of masks are overlaid and formed in one layer on a substrate.

In step S101, the target layout of a device to be manufactured from a substrate that undergoes multiple patterning, that is, a target pattern to be formed in one layer on the substrate is acquired. For example, assuming the M1 process of a logic device, the target layout is acquired in a format such as gds or oasis. The target pattern and the target layout are patterns to be divided into patterns for the respective masks by the generation method according to this embodiment.

In step S102, non-active regions on the device are specified based on the target layout acquired in step S101. A device circuit includes regions where there is no influence on the device characteristic independently of the pattern elements resolve or not. Such a region is specified as a non-active region and stored as layer information in, for example, the gds format. For example, in the interconnection layer of a circuit, interconnections in an active region are connected to the upper layer or the lower layer via contact holes. Hence, a region that is not connected to the upper layer or the lower layer via a contact hole is a non-active region.

In other words, in step S102, allowable points that allow patterns to be transferred are specified at points other than the target pattern elements constituting the target pattern out of a plurality of points on a grid set on the substrate. The grid set on the substrate defines a lattice with lattice intersections arranged on the target pattern elements formed on the substrate. The lattice pitch can either equal the minimum pitch of the pattern elements formed on the substrate or be an integer fraction of the minimum pitch.

In step S103, the target pattern elements constituting the target pattern are grouped based on the non-active region specified in step S102. The target pattern elements to be grouped here form a target pattern element group which includes, out of the elements constituting the target pattern, target pattern elements whose distance to an adjacent target pattern element is shorter than the resolution limit of the exposure apparatus.

In step S104, constraint conditions representing mask pattern elements that must not be arranged in the same mask are set. For example, a constraint condition that mask pattern elements corresponding to target pattern elements whose distance to an adjacent target pattern element is $k_1=0.35$ must not be arranged in the same mask is set. Note that $k_1=0.35$ corresponds to 100 nm when the numerical aperture (NA) of the projection optical system is 1.35, and the exposure wavelength is 193.368 nm.

In step S105, the data of the patterns of the plurality of masks are generated. At this time, the constraint conditions set in step S104 are satisfied using mask pattern elements corresponding to the target pattern elements grouped in step S103 and those not grouped as division nodes. In other words, in step S105, the data of the patterns of the plurality of masks are generated such that the mask pattern elements corresponding to the target pattern elements grouped in step S103 are arranged in the same mask.

Figure 2:
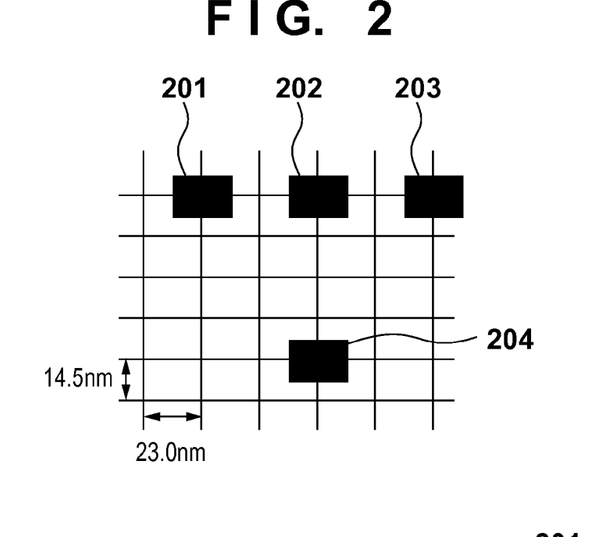
FIG. 2 is a view showing an example of a target pattern to be formed on a substrate.

The processes of steps S101 to S105 will be described below in detail. FIG. 2 is a view showing an example of a target pattern to be formed on a substrate. The target pattern includes target pattern elements 201, 202, 203, and 204 as cut patterns that cut a line pattern formed on the substrate and used in a one-dimensional layout, as shown in FIG. 2. The grid set on the substrate has an X-direction pitch of 23 nm and a Y-direction pitch of 14.5 nm. For example, assume that target pattern elements existing within the critical pitch (for example, 100 nm when $k_1$: 0.35, numerical aperture (NA) of projection optical system: 1.35, exposure wavelength: 193.368 nm) cannot be arranged in the same mask due to the resolution limit.

Figure 3:
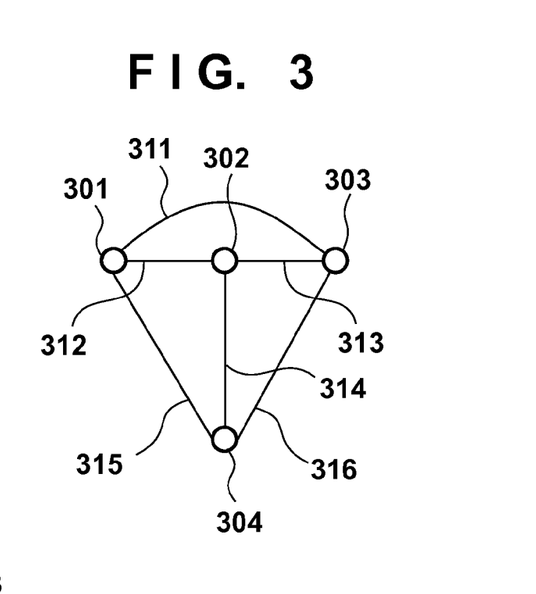
FIG. 3 is a view showing an example of a conflict graph.

In this case, the conflict graph is represented by nodes and edges as shown in FIG. 3. Reference numerals 301, 302, 303, and 304 denote nodes of the conflict graph corresponding to the target pattern elements 201, 202, 203, and 204, respectively; and 311, 312, 313, 314, 315, and 316, edges of the conflict graph. The nodes 301 to 304 exist within the critical pitch, and are therefore connected by the edges 311 to 316.

Figure 4:
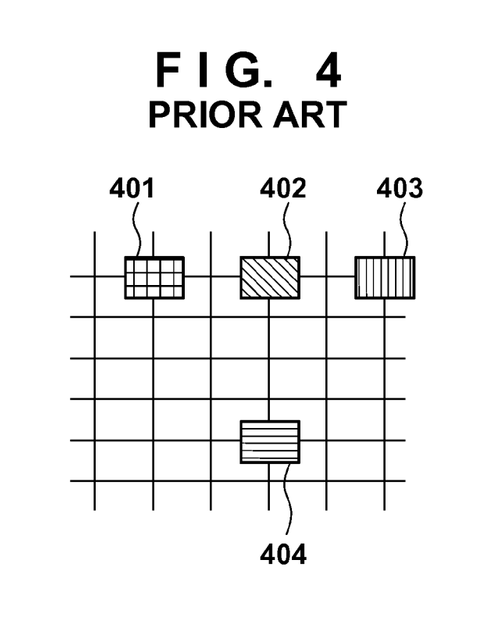
FIG. 4 is a view for explaining division of target pattern elements according to a related art.

Referring to FIG. 3, the nodes at the two ends of each of the edges 311 to 316 need to have mask numbers different from each other (that is, need to be arranged in different masks). Hence, in the related art, mask pattern elements corresponding to the target pattern elements 201 to 204 shown in FIG. 2 need to be arranged in masks different from each other, and the number of masks (number of divisions) is 4, as shown in FIG. 4. Referring to FIG. 4, reference numeral 401 denotes a target pattern element (target pattern element 201) to be transferred by a first mask; and 402, a target pattern element (target pattern element 202) to be transferred by a second mask. Similarly, reference numeral 403 denotes a target pattern element (target pattern element 203) to be transferred by a third mask; and 404, a target pattern element (target pattern element 204) to be transferred by a fourth mask.

Figure 5:
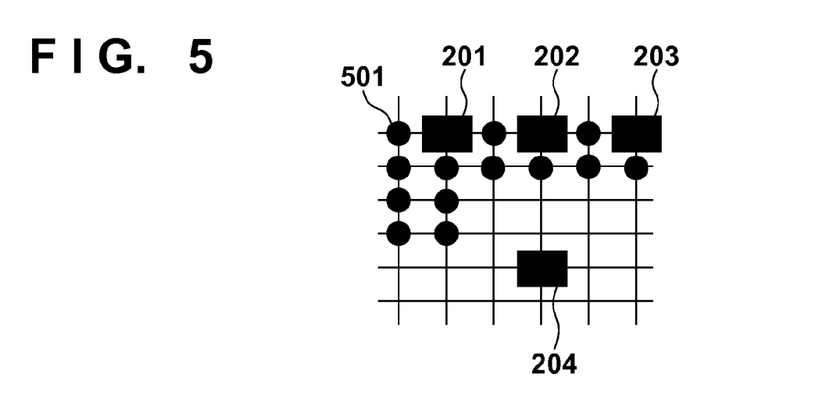
FIG. 5 is a view showing allowable points on a grid that defines an array of smallest units constituting a pattern formed on a substrate.

However, as described above, the device circuit includes regions where there is no influence on the device characteristic independently of whether pattern elements resolve or not, that is, allowable points (points of the grid) 501 that allow mask pattern elements to be transferred, as shown in FIG. 5. Although they are not mask pattern elements corresponding to target pattern elements, the allowable points 501 are marked in, for example, gds data as points on the grid that allow mask pattern elements to be transferred so that their positions can always be grasped. For example, data representing each allowable point 501 is added to the layer of a standard cell representing a unit element of the device circuit, thereby easily forming the marking layer of chip level. In this way, the non-active regions on the device are specified, and data for specifying the non-active regions are generated in step S102. Note that active regions (prohibition points) where pattern transfer is prohibited may be set at points other than the allowable points and the points of the target pattern elements on the grid.

Figure 6:
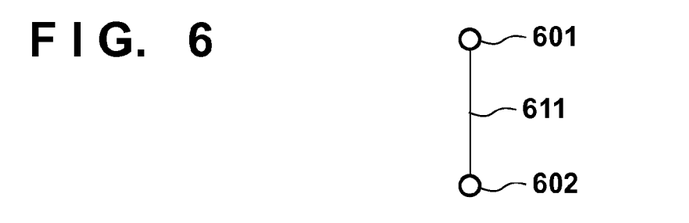
FIG. 6 is a view showing an example of a conflict graph.

In step S103, adjacent target pattern elements on the grid which are spaced apart via a non-active region, that is, adjacent target pattern elements the space between which is filled with an allowable point are grouped into one pattern element. Referring to FIG. 5, for example, the target pattern elements 201, 202, and 203 are grouped into one target pattern element because the spaces between them are filled with the allowable points 501. The space between the target pattern elements 202 and 204 is not filled with an allowable point. Hence, the target pattern elements 201 to 204 are divided into the grouped target pattern elements 201, 202, and 203 and the ungrouped target pattern element 204. Hence, the conflict graph is represented by nodes and edges as shown in FIG. 6. Referring to FIG. 6, the nodes representing the target pattern elements are integrated into one node 601 corresponding to the grouped target pattern elements 201, 202, and 203 and a node 602 corresponding to the ungrouped target pattern element 204. In addition, only an edge 611 represents the constraint condition. Note that target pattern element group in which no prohibition point exists between the target pattern elements may be defined as one group (that is, may be grouped into one pattern element). More specifically, the target pattern elements 201, 202, and 203 are put into one group because no prohibition point exists between them. The target pattern elements 202 and 204 are put into different groups because a prohibition point exists between them.

In step S105, mask pattern elements corresponding to the grouped target pattern elements and the ungrouped target pattern elements are defined as nodes. The mask pattern elements corresponding to the target pattern elements are divided (distributed) into a plurality of masks such that the constraint condition is satisfied, thereby generating the data of the patterns of the plurality of masks.

When dividing the target pattern elements into a plurality of masks, for example, integer programming is usable. An example of an integer programming program aiming at minimizing the number of masks is shown by the following expressions.

(1) Explanation of Variables $$j: \text{mask number } 1 \leq j \leq m \tag{1}$$

$$m: \text{maximum mask number} \tag{2}$$

$$y_j: \text{binary variable representing whether to use the mask number } j, 1 \text{ when the mask number } j \text{ is used, and } 0 \text{ when not used} \tag{3}$$

$$i: \text{number of pattern element} \tag{4}$$

$$x_{ij}: \text{binary variable representing whether to use the mask number } j \text{ for pattern element number } i, 1 \text{ when the mask number } j \text{ is used, and } 0 \text{ when not used} \tag{5}$$

(2) Explanation of Expressions

A cost function (objective function) including a function defining the number of masks (number of divisions) is given as follows. The data of a pattern of a mask is generated using integer programming such that the value of the cost function satisfies a reference value.

$$\text{minimize} \sum_{j=1}^{m} y_j \tag{6}$$

Expression (6) indicates that the number of mask numbers (number of divisions of the mask) used in multiple patterning needs to be minimized.

$$\sum_{j=1}^{m} y_j \tag{7}$$

The value of expression (7) equals the number of mask numbers. Hence, for example, when the number of mask numbers increases from 2 to 3, the value of expression (7) also increases from 2 to 3. The number of mask numbers indicated here corresponds to the number of masks obtained by dividing (distributing) the target pattern elements and used in multiple patterning. It is therefore important to make the number of mask numbers as small as possible from the viewpoint of mask cost.

The constraint conditions are given by $$y_1 \geq y_2 \geq \ldots \geq y_m \tag{8}$$

$$\sum_{j=1}^{m} x_{ij} = 1 (\forall i) \tag{9}$$

$$x_{ij} \leq y_j (\forall i, \forall j) \tag{10}$$

$$x_{ij} + x_{i'j} \leq 1 (\forall j) \tag{11}$$

The boundary condition is given by $$y_1 = 1 \tag{12}$$

Expression (8) is the constraint condition indicating that the mask numbers need to be used in ascending order. This constraint condition prevents $y_2=1$ when $y_1=0$, that is, prevents the second mask number from being used when the first mask number is not used.

Expression (9) indicates that only one mask number needs to be set for the ith pattern element $X_i$. Expression (9) is the constraint condition that prevents both the first mask number and the second mask number from being set for the ith pattern element.

Expression (10) is the constraint condition indicating that a mask number not to be used is not set as the mask number of a pattern element. Expression (10) is the constraint condition that prevents the jth mask number from being used for the ith pattern element ($x_{ij}=1$) when the jth mask number is not used ($y_j=0$).

Expression (11) is the constraint condition indicating that the ith pattern element and the i'th pattern element must not have the same mask number. Hence, this constraint condition is set not for all pattern elements but for pattern elements existing within the constraint region. In this embodiment, this corresponds to determining one node 601 corresponding to the target pattern elements 201, 202, and 203 and the node 602 corresponding to the target pattern element 204. This constraint condition prevents, for example, pattern elements existing within the critical pitch (100 nm when $k_1$: 0.35, numerical aperture (NA) of projection optical system: 1.35, exposure wavelength: 193.368 nm) from being arranged in the same mask.

As the boundary condition, a condition that the first mask number needs to be used is set, as indicated by expression (12).

The above-described expressions are input to integer programming execution software and calculated, thereby generating the data of the patterns of the plurality of masks used in multiple patterning.

Figure 7:
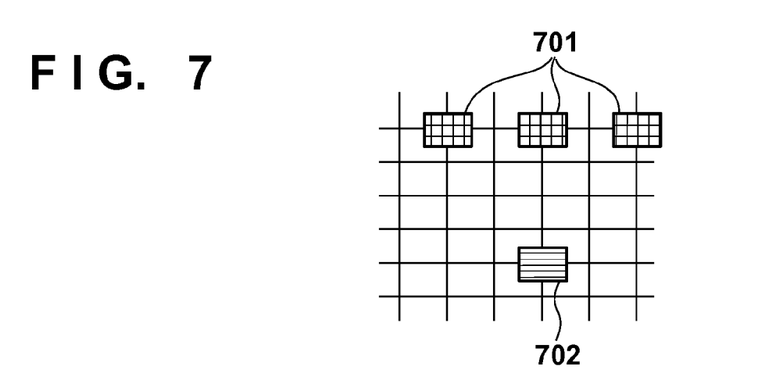
FIG. 7 is a view for explaining division (distribution) of a target pattern element.

This embodiment uses the constraint condition that target pattern elements existing within the critical pitch cannot be arranged in the same mask. Hence, the target pattern elements 201 to 204 are divided into two groups, that is, a group 701 including the target pattern elements 201 to 203 and a group 702 including the target pattern element 204, as shown in FIG. 7.

Figure 8:
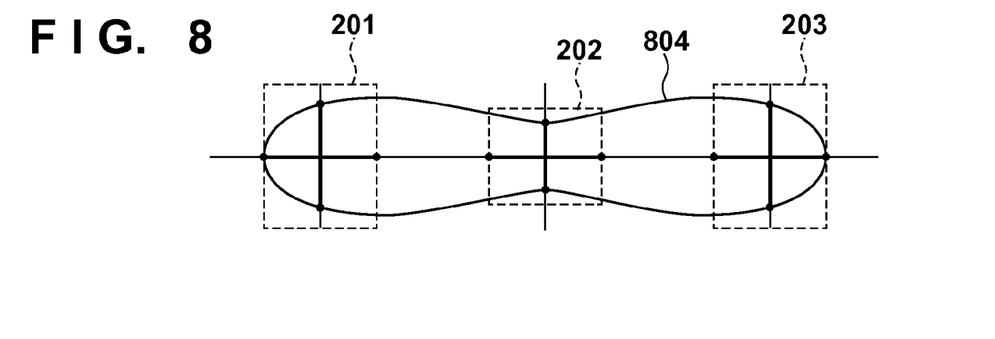
FIG. 8 is a view showing a result of lithography simulation according to the first embodiment.

FIG. 8 is a view showing a result of lithography simulation of mask pattern elements corresponding to the target pattern elements 201 to 203 arranged in the same mask. Referring to FIG. 8, an optical image 804 resolves even between the target pattern elements 201 to 203. However, there is no problem because these positions correspond to the non-active regions on the device.

As described above, according to the generation method of this embodiment, it is possible to generate the data of the patterns of masks used in multiple patterning while decreasing the number of masks. The data of the patterns of the masks generated by the generation method of this embodiment are input to a mask drawing apparatus. The mask drawing apparatus manufactures a plurality of masks to be used in multiple patterning based on the input data. Each mask manufactured by the mask drawing apparatus is placed on the mask stage of the exposure apparatus and illuminated by the illumination optical system to form the image of the mask pattern on a substrate. After the substrate is exposed using one of the masks manufactured by the mask drawing apparatus, the same layer on the substrate is exposed using another mask (that is, multiple patterning is performed), thereby forming the pattern in one layer on the substrate.

<Second Embodiment>

Figure 9:
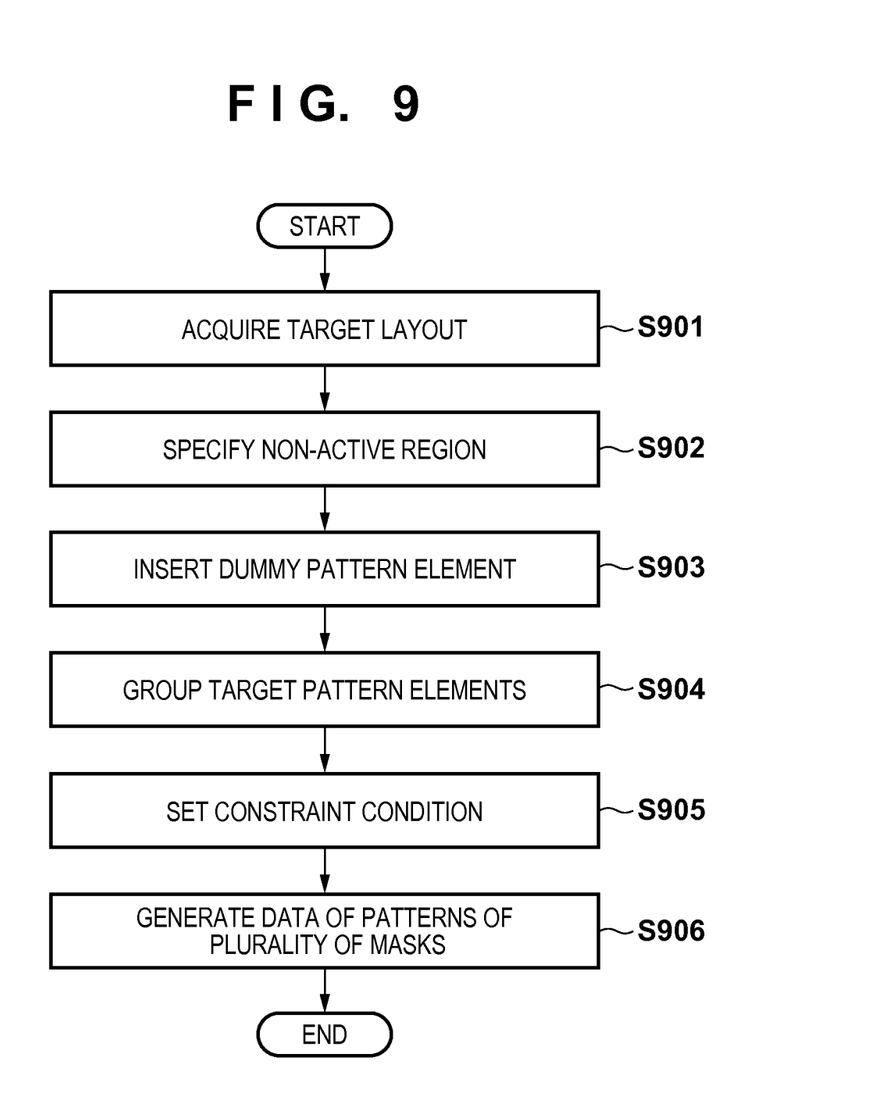
FIG. 9 is a flowchart for explaining a generation method according to the second embodiment of the present invention.

FIG. 9 is a flowchart for explaining a generation method according to the second embodiment of the present invention. This generation method is executed by (the processing unit of) an information processing apparatus such as a computer to generate the data of the patterns of a plurality of masks used in multiple patterning to be performed by at least one of a plurality exposure apparatuses for exposing a substrate. Note that steps S901 and S902 are the same as steps S101 and S102 shown in FIG. 1, and a detailed description thereof will be omitted here.

In step S903, dummy pattern elements are inserted based on the non-active regions specified in step S902. For example, a dummy pattern element is inserted between adjacent target pattern elements on the grid the space between which is filled with an allowable point. At this time, the dummy pattern element may be inserted between adjacent target pattern elements on the grid the space between which is filled with an allowable point such that the target pattern elements are connected. Note that the dummy pattern element can be either a pattern element to be transferred to the substrate or a pattern element not to be transferred to the substrate.

In step S904, the target pattern elements constituting the target pattern, including the dummy pattern elements inserted in step S903, are grouped. In other words, adjacent target pattern elements the space between which is filled with the allowable point and the dummy pattern element are grouped.

In step S905, constraint conditions representing mask pattern elements that must not be arranged in the same mask are set, as in step S104 of FIG. 1.

In step S906, the data of the patterns of the plurality of masks are generated, as in step S105 of FIG. 1. At this time, the constraint conditions set in step S905 are satisfied using mask pattern elements corresponding to the target pattern elements grouped in step S904 and those not grouped as division nodes. In other words, in step S906, the data of the patterns of the plurality of masks are generated such that the mask pattern elements corresponding to the target pattern elements and dummy pattern elements grouped in step S904 are arranged in the same mask.

The processes of steps S901 to S906 will be described below in detail. The target pattern to be formed on the substrate is assumed to the target pattern shown in FIG. 2, as in the first embodiment. Hence, allowable points 501 on the grid are specified as non-active regions on the device, as shown in FIG. 5.

Figure 10:
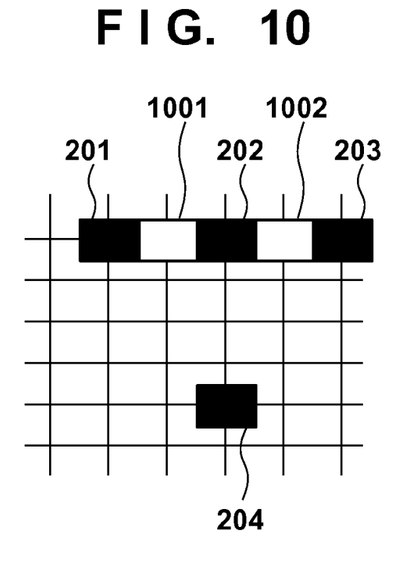
FIG. 10 is a view for explaining insertion of a dummy pattern element.

In step S903, a dummy pattern element is inserted between adjacent target pattern elements on the grid the space between which is filled with the allowable point 501. For example, as shown in FIG. 10, dummy pattern elements 1001 and 1002 are inserted between a target pattern element 201 and a target pattern element 202 and between the target pattern element 202 and a target pattern element 203, respectively. In this embodiment, the dummy pattern elements 1001 and 1002 are inserted such that the isolated target pattern elements 201 to 203 are connected.

Figure 11:
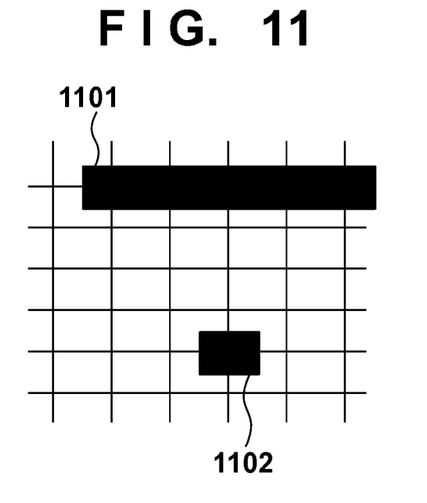
FIG. 11 is a view for explaining grouping of target pattern elements and dummy pattern elements.

In step S904, for example, since the target pattern element 201, the dummy pattern element 1001, the target pattern element 202, the dummy pattern element 1002, and the target pattern element 203 are adjacent (connected), they are grouped into one pattern element. Hence, the target pattern elements 201 to 204 and the dummy pattern elements 1001 and 1002 are divided into two groups, that is, groups 1101 and 1102, as shown in FIG. 11. The group 1101 includes the target pattern element 201, the dummy pattern element 1001, the target pattern element 202, the dummy pattern element 1002, and the target pattern element 203. The group 1102 includes the target pattern element 204.

In steps S905 and S906, constraint conditions are set, the target pattern elements and the dummy pattern elements are divided (distributed) into a plurality of masks such that the constraint conditions are satisfied, and the data of the patterns of the plurality of masks are generated, as in the first embodiment. At this time, a conflict graph obtained from the target pattern elements and dummy pattern element grouped as shown in FIG. 11 is represented by nodes and edges as shown in FIG. 6, as in the first embodiment. A node 601 corresponds to the target pattern element 201, the dummy pattern element 1001, the target pattern element 202, the dummy pattern element 1002, and the target pattern element 203, and a node 602 corresponds to the target pattern element 204.

Figure 12:
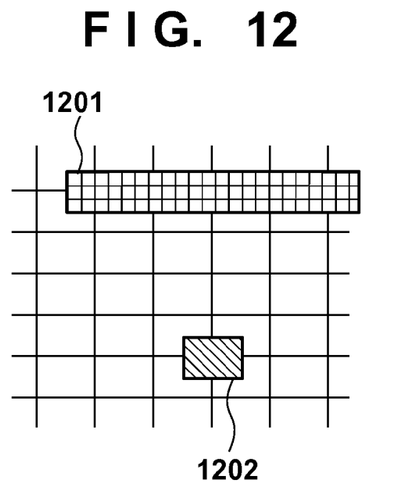
FIG. 12 is a view for explaining division (distribution) of target pattern elements and dummy pattern elements.

The number of masks (number of divisions) is 2, as shown in FIG. 12. Referring to FIG. 12, reference numeral 1201 denotes a pattern element (target pattern element 201, dummy pattern element 1001, target pattern element 202, dummy pattern element 1002, and target pattern element 203) to be transferred by a first mask; and 1202, a pattern element (target pattern element 204) to be transferred by a second mask.

As described above, according to the generation method of this embodiment, it is possible to generate the data of the patterns of masks used in multiple patterning while decreasing the number of masks. In addition, when the dummy pattern elements are inserted, the exposure margin increases.

Figure 13:
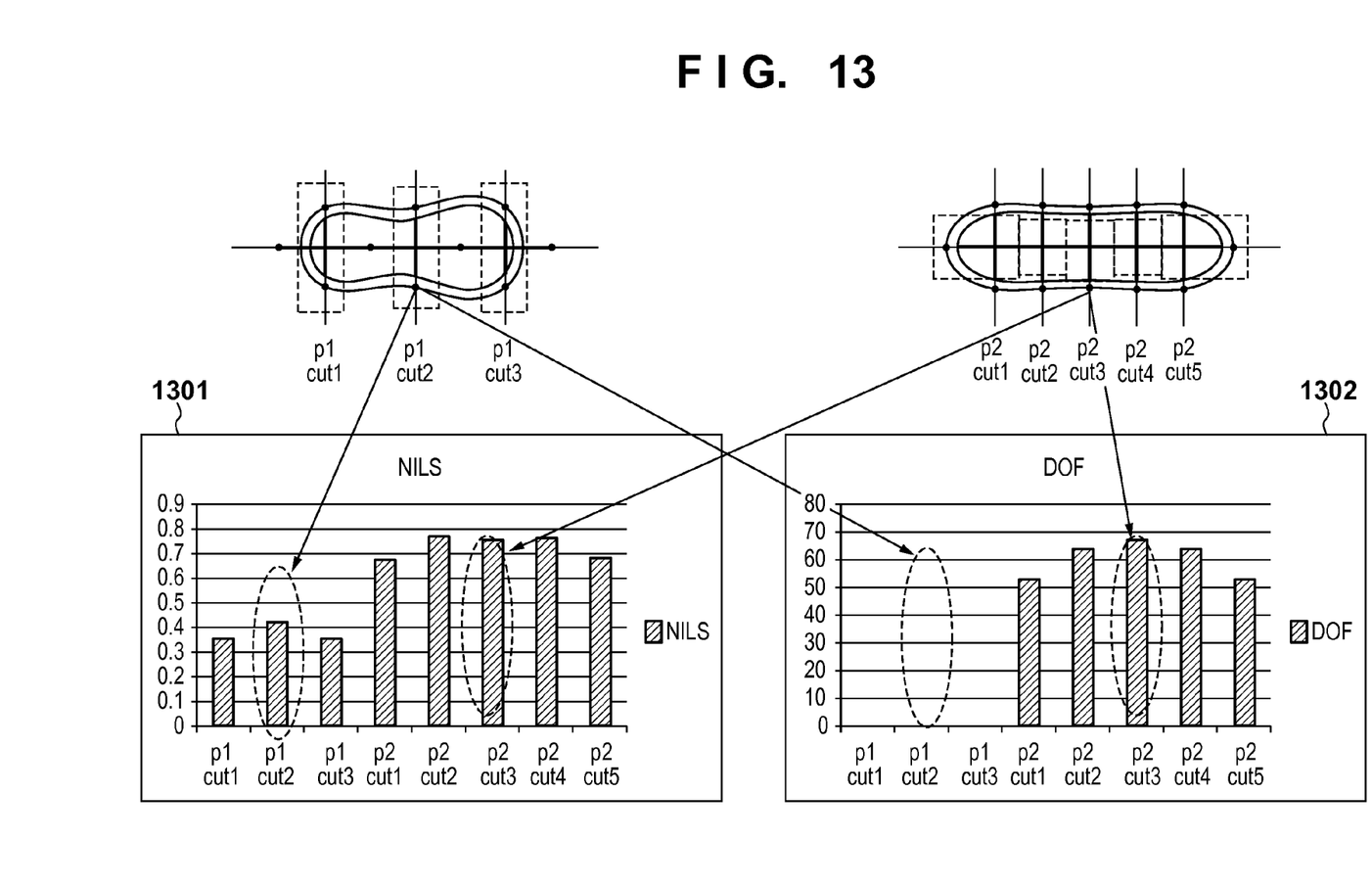
FIG. 13 is a view for explaining an increase in the exposure margin caused by insertion of dummy pattern elements.

FIG. 13 is a view for explaining an increase in the exposure margin caused by insertion of dummy pattern elements. Simulations were conducted by setting the NA of the projection optical system to 1.35 and the exposure wavelength to 193.368 nm as exposure conditions, and setting a cross pole (tangential polarization) having an outer sigma of 0.95, an annular ratio of 0.75, and an aperture angle of 30° as illumination conditions. Referring to FIG. 13, when only grouping of target pattern elements is performed (first embodiment), NILS (Normalized Image Logarithmic Slope) is about 0.4, and DOF (Depth Of Focus) is 0 nm at an evaluation point 1301. On the other hand, when dummy pattern elements are inserted, and target pattern elements are grouped (second embodiment), NILS is about 0.7, and DOF is about 65 nm at an evaluation point 1302. The exposure margin increases, as can be seen.

<Third Embodiment>

Figure 14:
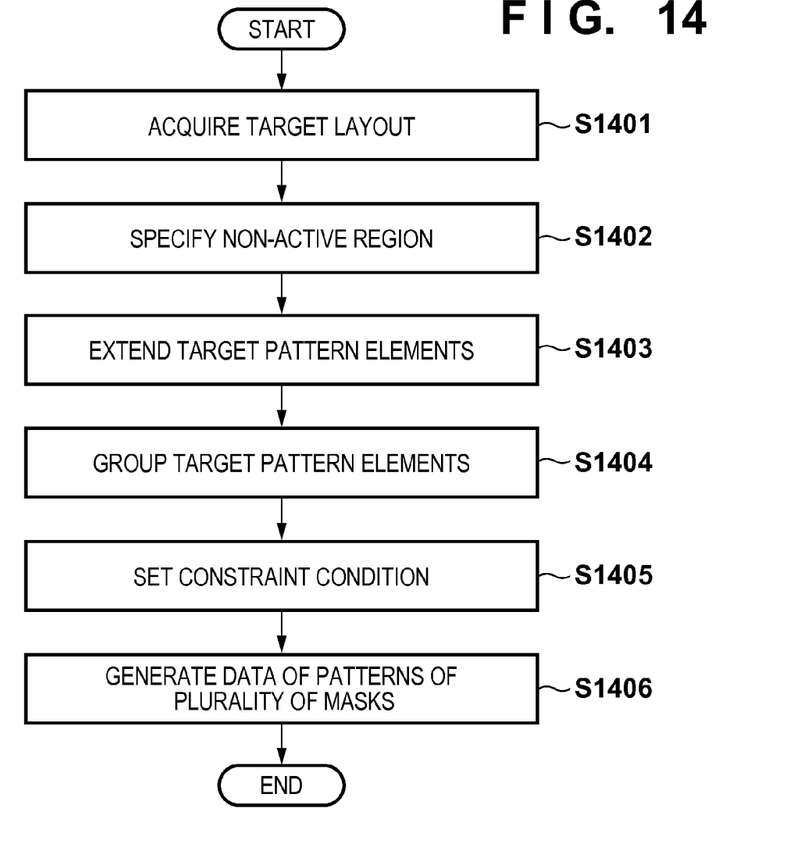
FIG. 14 is a flowchart for explaining a generation method according to the third embodiment of the present invention.

FIG. 14 is a flowchart for explaining a generation method according to the third embodiment of the present invention. This generation method is executed by (the processing unit of) an information processing apparatus such as a computer to generate the data of the patterns of a plurality of masks used in multiple patterning to be performed by an exposure apparatus for exposing a substrate. Note that steps S1401, S1402, S1405, and S1406 are the same as steps S101, S102, S104, and S105 shown in FIG. 1, and a detailed description thereof will be omitted here.

Figure 15:
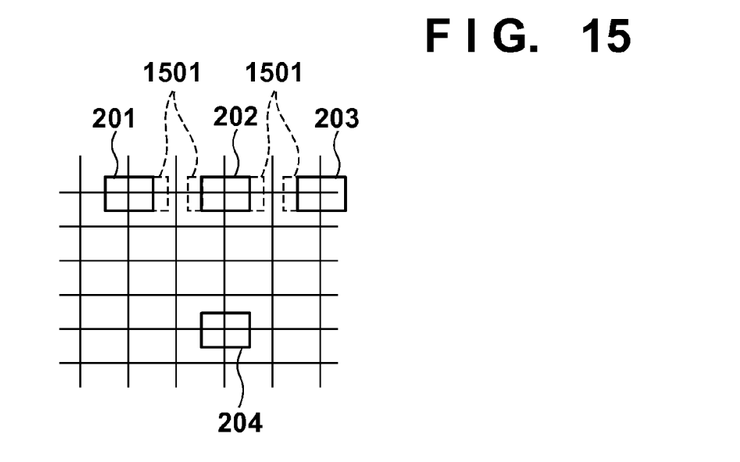
FIG. 15 is a view for explaining extension of a target pattern element.

In step S1403, target pattern elements are extended based on the non-active regions specified in step S1402. For example, adjacent target pattern elements on the grid the space between which is filled with an allowable point are extended toward the allowable point. In this embodiment, as shown in FIG. 15, extension portions 1501 are set for target pattern elements 201, 202, and 203 to extend them.

In step S1404, the target pattern elements constituting the target pattern, that is, the target pattern elements extended in step S1403 and those not extended in step S1403 are grouped.

In the second embodiment, a dummy pattern element is inserted between adjacent target pattern elements on the grid the space between which is filled with an allowable point, and the target pattern elements including the dummy pattern elements are grouped. However, even when the target pattern elements are extended without inserting dummy pattern elements, as in this embodiment, the exposure margin can be increased while decreasing the number of masks (number of divisions). As described above, when the target pattern elements are extended to the non-active regions on the device, and the target pattern elements with the non-active regions between them are grouped into one pattern element, the same effects as in the case in which the dummy pattern elements are inserted can be obtained. Especially when the target pattern elements are extended until their extension portions overlap, effects that are precisely the same as in the case in which the dummy pattern elements are inserted can be obtained in terms of layout.

In this embodiment, the grid is set on the substrate. However, the grid may be defined on the mask pattern.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-033870 filed on Feb. 22, 2013, which is hereby incorporated by reference herein in its entirety.

What is claimed is:

1. A generation method of generating data of patterns of a plurality of masks used in an exposure apparatus for exposing a substrate, comprising the following steps being performed by a computer:
    a first step of specifying, from a plurality of points on a grid having pattern elements to be formed on the substrate as intersections, an allowable point that allows a pattern to be transferred on the substrate other than points of target pattern elements constituting a target pattern to be formed on the substrate;
    a second step of, for a pattern element group including a target pattern element whose distance to an adjacent target pattern element is shorter than a resolution limit of the exposure apparatus, grouping the adjacent target pattern elements on the grid a space between which is filled with the allowable point; and
    a third step of generating the data of the patterns of the plurality of masks such that mask pattern elements corresponding to the target pattern elements grouped in the second step are arranged in the same mask,
    wherein the target pattern is a pattern for cutting a line pattern extended in one direction formed on the substrate,
    wherein the line pattern is cut by a pattern transferred at points of the target pattern elements grouped in the second step and the allowable point between the target pattern elements grouped in the second step, and
    wherein there is no influence on a device to be manufactured from the substrate when the line pattern is cut by a pattern transferred at the allowable point.

2. The method according to claim 1, wherein
    in the second step, a dummy pattern element is inserted between the adjacent target pattern elements on the grid the space between which is filled with the allowable point, and the dummy pattern element and the adjacent target pattern elements the space between which is filled with the allowable point are grouped, and
    in the third step, the data of the patterns of the plurality of masks are generated such that the mask pattern elements corresponding to the dummy pattern element and the target pattern elements grouped in the second step are arranged in the same mask.

3. The method according to claim 2, wherein the dummy pattern element is inserted so as to connect the adjacent target pattern elements on the grid the space between which is filled with the allowable point.

4. The method according to claim 2, wherein the dummy pattern element is a pattern element to be transferred to the substrate.

5. The method according to claim 1, wherein
    in the second step, the adjacent target pattern elements on the grid the space between which is filled with the allowable point are extended toward the allowable point, and the extended target pattern elements are grouped, and
    in the third step, the data of the patterns of the plurality of masks are generated such that the mask pattern elements corresponding to the extended target pattern elements grouped in the second step are arranged in the same mask.

6. The method according to claim 1, wherein in the third step, a cost function including a function defining a number of the plurality of masks is defined, and the data of the patterns of the plurality of masks are generated such a value of the cost function satisfies a reference value using integer programming.

7. A non-transitory storage medium storing a program that causes a computer to execute a generation method of generating data of patterns of a plurality of masks used in an exposure apparatus for exposing a substrate, the program causing the computer to execute:

a first step of specifying, from a plurality of points on a grid having pattern elements to be formed on the substrate as intersections, an allowable point that allows a pattern to be transferred on the substrate other than points of target pattern elements constituting a target pattern to be formed on the substrate;

a second step of, for a pattern element group including a target pattern element whose distance to an adjacent target pattern element is shorter than a resolution limit of the exposure apparatus, grouping the adjacent target pattern elements on the grid a space between which is filled with the allowable point; and a third step of generating the data of the patterns of the plurality of masks such that mask pattern elements corresponding to the target pattern elements grouped in the second step are arranged in the same mask, wherein the target pattern is a pattern for cutting a line pattern extended in one direction formed on the substrate, wherein the line pattern is cut by a pattern transferred at points of the target pattern elements grouped in the second step and the allowable point between the target pattern elements grouped in the second step, and wherein there is no influence on a device to be manufactured from the substrate when the line pattern is cut by a pattern transferred at the allowable point.

8. An information processing apparatus for generating data of patterns of a plurality of masks used in an exposure apparatus for exposing a substrate, comprising:

a processing unit configured to generate the data of the patterns of the plurality of masks, the processing unit performing:

a first step of specifying, from a plurality of points on a grid having pattern elements to be formed on the substrate as intersections, an allowable point that allows a pattern to be transferred on the substrate other than points of target pattern elements constituting a target pattern to be formed on the substrate;

a second step of, for a pattern element group including a target pattern element whose distance to an adjacent target pattern element is shorter than a resolution limit of the exposure apparatus, grouping the adjacent target pattern elements on the grid a space between which is filled with the allowable point; and a third step of generating the data of the patterns of the plurality of masks such that mask pattern elements corresponding to the target pattern elements grouped in the second step are arranged in the same mask, wherein the target pattern is a pattern for cutting a line pattern extended in one direction formed on the substrate, wherein the line pattern is cut by a pattern transferred at points of the target pattern elements grouped in the second step and the allowable point between the target pattern elements grouped in the second step, and wherein there is no influence on a device to be manufactured from the substrate when the line pattern is cut by a pattern transferred at the allowable point.

* * * * *